United States Patent
Dalluge et al.

(10) Patent No.: US 10,174,258 B2
(45) Date of Patent: Jan. 8, 2019

(54) TWO-STAGE BIOMASS PYROLYSIS

(71) Applicant: PHILLIPS 66 COMPANY, Houston, TX (US)

(72) Inventors: Dustin L. Dalluge, Bartlesville, OK (US); Steven E. Lusk, Ponca City, OK (US); Samuel T. Jones, Dewey, OK (US); Johnathan T. Gorke, Houston, TX (US)

(73) Assignee: Phillips 66 Company, Houston, TX (US)

( * ) Notice: Subject to any disclaimer, the term of this patent is extended or adjusted under 35 U.S.C. 154(b) by 143 days.

(21) Appl. No.: 15/435,990

(22) Filed: Feb. 17, 2017

(65) Prior Publication Data

US 2017/0240814 A1  Aug. 24, 2017

Related U.S. Application Data

(60) Provisional application No. 62/298,557, filed on Feb. 23, 2016.

(51) Int. Cl.

| C10B 53/02 | (2006.01) |
| C10B 57/06 | (2006.01) |
| C10B 49/16 | (2006.01) |
| C10B 3/00  | (2006.01) |
| C10B 5/00  | (2006.01) |
| C10B 7/10  | (2006.01) |
| C10B 49/06 | (2006.01) |
| C10B 49/18 | (2006.01) |

(52) U.S. Cl.
CPC .............. *C10B 53/02* (2013.01); *C10B 49/16* (2013.01); *C10B 57/06* (2013.01); *Y02E 50/14* (2013.01); *Y02P 20/145* (2015.11)

(58) Field of Classification Search
CPC .. C10B 53/02; C10B 3/00; C10B 5/00; C10B 7/10; C10B 49/06; C10B 49/18; C10B 57/06
See application file for complete search history.

(56) References Cited

U.S. PATENT DOCUMENTS

2012/0091395 A1*  4/2012  Tetzlaff .................... C10J 3/482
                                                                252/373

* cited by examiner

Primary Examiner — Brian A McCaig
(74) Attorney, Agent, or Firm — Phillips 66 Company

(57) ABSTRACT

The present disclosure relates generally to a two-stage biomass pyrolysis processes that maximize pyrolysis vapor yield from a lignocellulosic biomass while being conducive to commercial-scale throughput of biomass. A lignocellulosic feedstock is first pyrolyzed in a reactor first stage comprising at least one auger at a temperature and residence time that produces pyrolysis vapors derived predominantly from cellulose and hemi-cellulose fractions of the feedstock. Partially-pyrolyzed feedstock from the reactor first stage is then pyrolyzed in a reactor second stage at a higher temperature for an additional residence time to produce additional pyrolysis vapors that are predominantly derived from lignin. Certain embodiments arrange multiple reactor first stages around a single reactor second stage.

14 Claims, 2 Drawing Sheets

TWO-STAGE BIOMASS PYROLYSIS

CROSS-REFERENCE TO RELATED APPLICATIONS

This application is a non-provisional application which according to 35 U.S.C. § 119(e), claims the benefit of, and the right of priority to, U.S. Provisional Application Ser. No. 62/298,557 filed Feb. 23, 2016, entitled "Two-Stage Biomass Pyrolysis," both of which are incorporated herein in their entirety, as permitted under 37 CFR 1.57(b).

STATEMENT REGARDING FEDERALLY SPONSORED RESEARCH OR DEVELOPMENT

None.

FIELD OF THE INVENTION

This invention relates to pyrolysis of organic matter into useful chemical or fuel products.

BACKGROUND

Conventional fast pyrolysis of biomass entails rapid heating of a biomass feedstock in a hypoxic environment to produce a combination of non-condensable gases (C1-C4), condensable pyrolysis vapors and solid carbonaceous char. Conventional fast pyrolysis of biomass typically mixes biomass with a heated solid particles (i.e., "heat carrier") to facilitate rapid heating of the biomass to a temperature ranging from 315° C. to 600° C. The resulting thermal-cracking of the heated feedstock produces non-condensable light gases, a solid carbonaceous char, and condensable pyrolysis vapors that can be converted to biofuels.

A major barrier to commercial implementation of this pyrolysis technology for production of biofuels is that the condensable pyrolysis vapors include many highly-reactive intermediate compounds comprising radicals. These compounds rapidly react to form secondary compounds that are difficult to upgrade to transportation fuels. One strategy to prevent this has been to minimize residence time of these primary pyrolysis vapors within the reactor to less than a few seconds, as increasing residence time directly correlates with an increase in undesirable products that negatively impact the yield of upgradable vapors. However, a total residence time of 45-60 sec or longer is often required to ensure complete pyrolysis of all cellulosic biomass components and to maximize vapor yields. Therefore, a short vapor residence time and long solids residence time are competing goals in a conventional biomass pyrolysis process.

Certain pyrolysis systems and processes have attempted to increase the yield of upgradeable pyrolysis vapors by minimizing the residence time of these vapors in the reactor. This has typically been achieved by either employing a small-volume pyrolysis reactor or increasing the throughput of a sweep gas to quickly move pyrolysis vapors out of the reactor. However, neither of these options is conducive to the design of a large, commercial-scale pyrolysis system. Small-volume pyrolysis reactors have a shorter vapor residence time that helps prevent secondary reactions of the pyrolysis vapors that can prevent subsequent upgrading. Unfortunately, small volume reactors often lack sufficient residence time to completely pyrolyze the feedstock, thereby lowering efficiency and yield beneath commercially-viable levels. Alternatively, increasing the throughput of sweep gas (or sweep gas rate) also decreases efficiency by: 1) excessively diluting the pyrolysis vapors, making subsequent catalytic upgrading less efficient, 2) requiring more energy to heat the larger volume of sweep gas, and 3) potentially increasing char entrainment in the pyrolysis vapors leaving the reactor.

A commercial scale process and system for biomass pyrolysis must increase the throughput of biomass while remaining efficient and maximizing the yield of upgradeable pyrolysis vapors. One conventional strategy for increasing biomass throughput is to employ a reactor comprising a mechanical device (e.g., an auger) that facilitates biomass movement through the reactor. Unfortunately, auger-type reactors become progressively less efficient as their size is increased to a commercial-scale throughput. For example, increasing the diameter or cross-section of an auger-type reactor leads to progressively less efficient mixing, and thus, less efficient heating of the feedstock. This decreases pyrolysis vapor yield. Alternatively, increasing the reactor length to achieve increased biomass residence time (thereby increasing pyrolysis vapor yield) simultaneously decreases efficiency by increasing the volume of heated sweep gas required to minimize pyrolysis vapor residence time (leading to the problems discussed above). The disadvantages of not providing sufficient biomass residence time include decreased yield (via incomplete pyrolysis) and the potential for clogging of the pyrolysis system due to continued pyrolysis of the biomass following its removal from the reactor.

Certainly, there is a need to improve fast pyrolysis processes and systems to allow the efficient pyrolysis of lignocellulosic biomass at commercial scale, and to facilitate commercial-scale rapid upgrading of biomass-derived pyrolysis vapors into products that are fungible with current petroleum-derived liquid hydrocarbon fuels.

BRIEF SUMMARY OF THE DISCLOSURE

In certain embodiments of the present disclosure, there is provided a process for pyrolyzing lignocellulosic biomass in a two-stage pyrolysis reactor, comprising the steps of: a) pyrolyzing a lignocellulosic feedstock in a reactor first stage that is maintained at a temperature from 315° C. to 400° C., where the reactor first stage comprises at least one auger that conveys the lignocellulosic biomass feedstock through the reactor first stage from a first end toward a second end, for a residence time ranging from 5 to 20 seconds, thereby producing a first product comprising a first condensable pyrolysis vapors and a first solids that comprises partially-pyrolyzed feedstock and char; b) passing the first product out of the reactor first stage through an interface located near the second end of the reactor first stage and directly into a reactor second stage that is maintained at a temperature in the range from 401° C. to 700° C.; c) pyrolyzing the partially-pyrolyzed feedstock in the reactor second stage for a residence time ranging from 30 seconds to 120 seconds to form more condensable pyrolysis vapors that mix with the original condensable pyrolysis vapors, and to form additional solids comprising char that mix with the first solids to form combined solids; and d) separating the first and second condensable pyrolysis vapors from the combined solids in a disengagement zone located within the reactor second stage, where the first condensable pyrolysis vapors are removed from the pyrolysis reactor within five seconds after being produced by the pyrolyzing of step a), and the second condensable pyrolysis vapors are removed from the pyrolysis reactor within five seconds after being produced by the pyrolyzing of step c).

In certain embodiments, the terminal falling velocity of particles in the combined solids becomes greater than the upward local velocity of the first and second condensable pyrolysis vapors in the disengagement zone, causing at least 99.5 wt. % of the combined solids to be retained in the reactor second stage.

In certain embodiments, the second pyrolysis reactor comprises a bed containing at least one catalyst that facilitates pyrolysis of the un-pyrolyzed biomass, facilitates upgrading of the second condensable pyrolysis vapors to a transportation fuel or fuel intermediate, or any combination of these. In these embodiments, one or more catalyst(s) may be added to the bed either continuously or intermittently via one or more catalyst inlet(s).

In certain embodiments, the first condensable pyrolysis vapors is derived predominantly from the pyrolysis of one or more of hemicellulose and cellulose, and the second condensable pyrolysis vapors is derived predominantly from the pyrolysis of lignin.

Certain embodiments of the process also include contacting the combined first and second condensable pyrolysis vapors with at least one upgrading catalyst downstream from the reactor second stage to produce a biofuel, or an intermediate thereof.

The reactor first stage is maintained at a temperature in the range from 325° C. to 400° C., and the reactor second stage is maintained at temperature in the range from 450° C. to 700° C., optionally 500° C. to 700° C. Optionally, the reactor second stage is maintained temperature that is at least 50° C. or even 100° C. higher than the reactor first stage.

In certain embodiments, the first condensable pyrolysis vapors are removed from the pyrolysis reactor within 3 sec, optionally within 1 sec after being produced by the pyrolyzing of part a), and the second condensable pyrolysis vapors are removed from the pyrolysis reactor within 3 sec after being produced by the pyrolyzing of part c).

Optionally, more than one reactor first stage directly interfaces with the reactor second stage, each reactor first stage passing the first product directly into the reactor second stage.

BRIEF DESCRIPTION OF THE DRAWINGS

A more complete understanding of the present invention and benefits thereof may be acquired by referring to the follow description taken in conjunction with the accompanying drawings in which.

Figure 1:
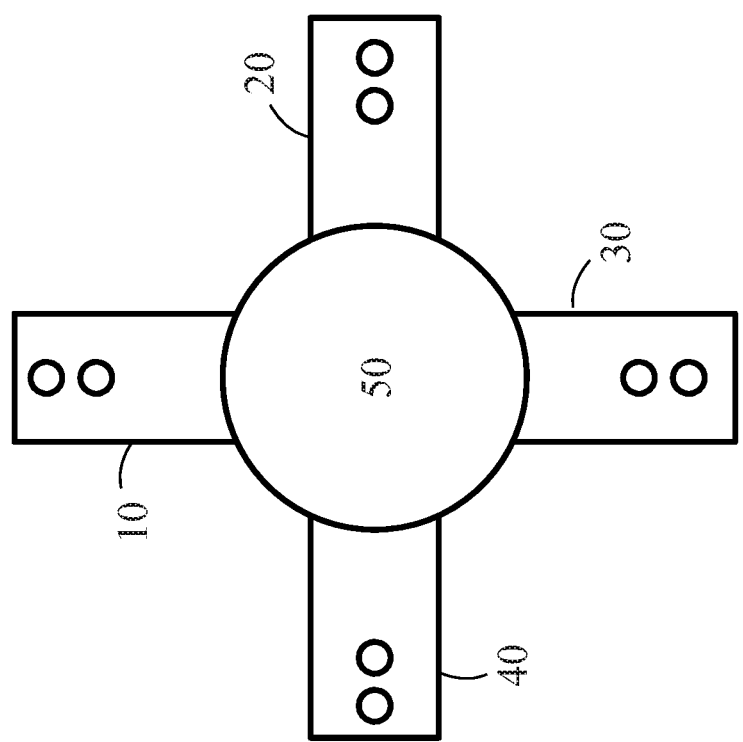
FIG. 1 is a simplified diagram representing one embodiment of the inventive processes and systems. The figure is not drawn to scale.

The invention is susceptible to various modifications and alternative forms, specific embodiments thereof are shown by way of example in the drawings. The drawings may not be to scale. It should be understood that the drawings are not intended to limit the scope of the inventive processes and systems to the particular embodiments illustrated. Rather, the drawings are intended to provide a better understanding of the full scope of the invention in all its embodiments.

DETAILED DESCRIPTION

The inventive processes disclosed below partly relate to processes and systems for pyrolyzing a lignocellulosic biomass feedstock in a pyrolysis reactor comprising two reactor stages. The inventive processes and systems provide multiple pyrolysis residence times for more efficient pyrolysis of the different molecular components within a lignocellulosic feedstock. In certain embodiments, each reactor stage conducts pyrolysis at a different temperature to further maximize the efficiency of cellulosic biomass conversion into products that are suitable for use as a liquid hydrocarbon transportation fuel, fuel component, or mixtures thereof.

Examples of biomass feedstock used in the present invention include, but are not limited to lignocellulosic biomass, which is available from a variety of sources including forest residues, dead trees, branches, leaves, tree stumps, yard clippings, wood chips, wood fiber, sugar beets, miscanthus, switchgrass, hemp, corn, corn fiber, poplar, willow, sorghum, sugarcane, paper manufacturing waste, agricultural residues (e.g., corn stover, wheat straw and sugarcane bagasse), dedicated energy crops (e.g., poplar trees, switchgrass, and miscanthus giganteus sugarcane) sawmill and paper mill discards.

Lignocellulosic biomass primarily comprises cellulose, hemicellulose and lignin. These three components have structural differences that lead to different rates of pyrolysis. Hemicellulose comprises various sugars (xylose, mannose, glucose, galactose, etc.) connected into a relatively random, highly branched, amorphous structure. A paper by Yang et al. demonstrated that hemicellulose pyrolysis requires relatively mild conditions from about 220° C. to about 315° C. with about 20 wt. % remaining as char. Cellulose comprises many long polymers of glucose that are relatively unbranched. It has a high degree of structural order and possesses good thermal stability. Yang, et al. further demonstrated that cellulose pyrolysis occurs predominantly at a higher temperature range from about 315° C. to about 400° C., with only about 6 wt. % remaining as char. Lastly, lignin possesses a high degree of thermal stability due to its high molecular weight, highly aromatic and cross-linked structure and thus, is more resistant to pyrolysis than cellulose or hemicellulose. Yang et al. found that cellulose and hemicellulose are both nearly completely pyrolyzed at 380° C., yet only around 20% of lignin is pyrolyzed at this temperature. Lignin pyrolysis was found to occur at a slower rate, yet this rate accelerated significantly at temperatures exceeding 400° C.

The inventive processes and systems described herein pyrolyze the lignocellulosic biomass in two stages: a reactor first stage maintained at a temperature that predominantly pyrolyzes cellulose and hemi-cellulose fractions for a relatively short residence time of less than 1 min. A first portion of condensable pyrolysis vapors form in the reactor first stage that are predominantly derived from the pyrolysis of cellulose and hemicellulose. A heated sweep gas (optionally, a reactive gas) may be used to quickly move the first pyrolysis vapors into a reactor second stage, while solids comprising char and partially-pyrolyzed feedstock are transported to the reactor second stage with the assistance of at least one auger located in the reactor first stage. In the reactor second stage, the first pyrolysis vapors are quickly separated from the solids in a disengagement zone and the vapors are removed from the pyrolysis reactor. The solids fall by gravitational force into a bed in the lower portion of the reactor second stage that may optionally also receive a catalyst via a separate inlet. Here, the un-pyrolyzed feedstock is pyrolyzed at a higher temperature for an additional residence time of up to two minutes to produce a second condensable pyrolysis vapors that is largely derived from the pyrolysis of lignin. These second pyrolysis vapors may be driven towards an outlet of the reactor by a second heated sweep gas (optionally, a reactive gas) that enters near the bottom of the reactor second stage and helps move the second pyrolysis vapors upward out of the bed of solids.

The temperature within the pyrolysis reactor first stage may be maintained via one or more mechanisms, including (but not limited to) heating of the reactor walls, heating of the at least one auger, microwave or inductive heating, addition of a heated sweep gas, and the addition of a solid particulate heat carrier that has been pre-heated to a temperature of at least 900° F. (482° C.). Regardless of the heating mechanism utilized, the pyrolysis reactor first stage is maintained at a temperature of at least 315° C., optionally at least 320° C., at least 325° C., or at least 330° C. In certain embodiments, the pyrolysis reactor first stage is maintained at a temperature that is within a range from 315° C. to 400° C., optionally within a range from 320° C. to 400° C., optionally within a range from 325° C. to 400° C.

Lignocellulosic biomass is processed to particles prior to being fed into the reactor first stage at a temperature that is typically less than 50° C. In preferred embodiments, the at least one auger within the reactor first stage facilitates mixing of the lignocellulosic biomass with a heated solid particulate heat carrier, which rapidly heats the feedstock, resulting in at least partial pyrolysis of the feedstock by predominantly volatilizing the cellulose and hemicellulose components to a gaseous product comprising condensable pyrolysis vapors and un-condensable light gases. Particulate heat carriers are conventional in the art and will not be discussed further here.

The rotational speed of the one or more augers is set to facilitate conveying of the lignocellulosic feedstock through and out of the reactor first stage within a defined amount of time. In certain embodiments, this solids residence time may be less than 40 sec, less than 30 sec, in a range from 5 to 30 sec, or in a range from 5 to 20 sec.

As mentioned, certain embodiments inject a heated sweep gas into the reactor first stage to facilitate the rapid evacuation of the first condensable pyrolysis vapors from the reactor first stage. The sweep gas may at least partly comprise a reducing gas such as an alkene, hydrogen gas or a molecule capable of donating hydrogen to reduce molecules present in the pyrolysis vapors. Residence time of the first pyrolysis gas product produced in the first pyrolysis stage is minimized to prevent secondary pyrolysis reactions (i.e., cracking, oligomerization, etc.) that decrease upgradability of the pyrolysis vapors. The residence time of the pyrolysis vapors within the reactor first stage may be less than 10 sec, less than 5 sec, less than 3 sec, less than 2 sec, or even less than 1 sec.

Solids comprising heated particulate heat carrier, partially-pyrolyzed biomass feedstock and char are transported through (and out of) the reactor first stage by the at least one auger and into the reactor second stage. In certain embodiments, the solids then fall by gravitational force into the reactor second stage, which optionally comprises a fluidized bed, rotary bed, stationary bed or any other suitable bed. The reactor second stage provides an additional solids residence time that may be at least 30 sec, at least 1 min, in the range of from 30 sec to 2 min, or in the range from 1 min to 2 min.

Optionally, a second heated sweep gas is added the reactor second stage and moves upward through the bed comprising solids to minimize the residence time within the reactor second stage of condensable pyrolysis vapors that are produced in the reactor second stage. In certain embodiments, the second sweep gas comprises a reducing gas that may comprise methane, an alkene, hydrogen gas or any other gaseous molecule capable of donating electrons to molecules in the pyrolysis vapors. Optionally, the reactor second stage is configured such that the second sweep gas enters and moves upward through a fluidized bed comprising the solids received from the reactor first stage.

The temperature within the reactor second stage may be maintained via one or more mechanisms, including (but not limited to) heating of the reactor walls, microwave or inductive heating, addition of a first and/or second heated sweep gas, and the addition of a solid particulate heat carrier that has been pre-heated to a temperature of at least 900° F. (482° C.).

The processes and systems disclosed herein provides two stages that facilitates two solids residence times, effectively providing additional solids residence time at a higher temperature for pyrolyzing more pyrolysis-resistant feedstock components (e.g., lignin) while simultaneously minimizes the residence time for pyrolysis vapors produced in each stage. This prevents secondary cracking reactions in the first pyrolysis vapors that are produced in the first stage (predominantly derived from cellulose and hemicellulose) by rapidly separating these vapors from char and unpyrolyzed feedstock and immediately removing the first pyrolysis vapors from the reactor. It also minimizes residence time for the second portion of pyrolysis vapors by rapidly separating these vapors from the solids (in a disengagement zone) immediately after they are formed in the second stage. The second pyrolysis vapors move upward in the reactor second stage with the assistance of a second sweep gas and merge with the first pyrolysis vapors in the disengagement zone.

Certain embodiments can further increase the biomass capacity of the system by adding multiple reactor first stages around the perimeter of a single reactor second stage comprising a fluidized bed. One example of this arrangement is depicted in FIG. 1, which shows an overhead view of four reactor first stages (10, 20, 30 and 40, respectively) interfacing with a single reactor second stage 50. Such an arrangement 1) minimizes the individual cross-sectional area of each reactor first stage to improve the mixing and heat transfer properties within each, while simultaneously 2) minimizing sweep gas throughput to minimizing dilution of pyrolysis vapors, 3) minimizing pyrolysis vapor residence time to avoid over-cracking and/or limiting the upgradability of the vapors, 4) maximizing pyrolysis vapor yield by using two stages to allow two different solids residence times at multiple temperatures. All of these advantages are maintained by the configuration depicted in FIG. 1 that includes multiple reactor first stages, while the system remains conducive to a commercial-scale pyrolysis of biomass.

The reactor second stage further comprises a disengagement zone above the bed comprising the solids received from the reactor first stage. The disengagement zone provides sufficient cross-sectional area such that the upward velocity of the gas mixture comprising sweep gas, uncondensable light gases and condensable pyrolysis vapors is slowed enough to allow gravitational disengagement of solid particulates. More specifically, the upward velocity of the gas mixture relative to the cross-sectional area of the disengagement zone must allow the terminal falling velocity of the solids (comprising particles of char and un-pyrolyzed feedstock) within the disengagement zone to become greater than the upward local velocity of the gas mixture, thereby causing at least 99.5 wt. % of the solids to be retained in the reactor second stage. This arrangement is advantageous because it avoids the need for additional cleaning or separating (such as via a cyclone separator) to remove solid particles of char and/or un-pyrolyzed feedstock from the gaseous product prior to downstream catalytic upgrading of the pyrolysis vapors. It is also advantageous because it minimizes the time required prior to downstream catalytic upgrading of the pyrolysis vapors.

As mentioned earlier, in some embodiments the reactor second stage is maintained at a higher temperature than the reactor first stage. This may be achieved in a variety of ways, including via addition of additional heated heat carrier directly into the reactor second stage, addition of a catalyst that facilitates an exothermic chemical reaction within the reactor second stage, or addition of a second heated sweep gas added directly into the reactor second stage (distinct from the sweep gas received from the reactor first stage). This second sweep gas may optionally be injected from the bottom of the reactor second stage to heat the solids and strip any additional pyrolysis vapors produced within the bed comprising solids received from the reactor first stage. This second sweep gas rises from the solids in the reactor second stage and combines with the gaseous product received from the reactor first stage, the combined gases typically leaving the reactor second stage via a common outlet. The additional residence time in the reactor second stage is sufficient to result allow more complete pyrolysis of more complex compounds (predominantly lignin) in the lignocellulosic biomass feedstock.

Figure 2:
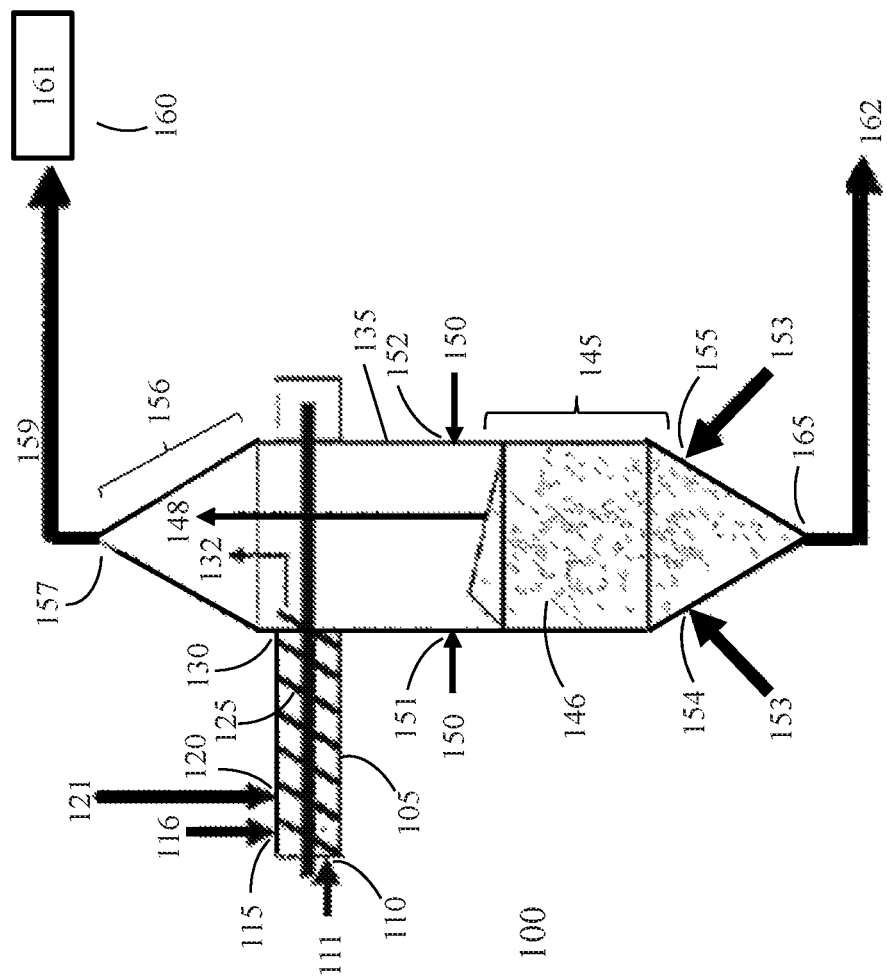
FIG. 2 is a simplified diagram representing one embodiment of the inventive processes and systems. The figure is not drawn to scale.

One embodiment of the inventive process and system for pyrolyzing a lignocellulosic biomass to produce useful chemical products or liquid transportation fuel products is depicted in FIG. 2. The pyrolysis reactor system 100 comprises a reactor first stage 105 comprising a feedstock inlet 115 for a feedstock 116 comprising lignocellulosic biomass, and an inlet 110 for a heat carrier 111 comprising heated solid particulates that rapidly transfer heat the feedstock 116. The reactor first stage 105 additionally comprises an inlet 120 for a heated sweep gas 121, and at least one auger that assists in mixing the heat carrier 111 with the feedstock 116, as well as helping to convey solids comprising heat carrier 111, the feedstock 116 and char (not shown) through the reactor first stage 105 in a residence time ranging from 5 to 20 seconds toward an interface 130 that connects the reactor first stage 105 directly to a reactor second stage 135. In certain embodiments, a single rotating auger 125 transports the heat carrier, the feedstock and solid pyrolysis products through the reactor first stage 105. In others, two rotating augers operate in a parallel configuration (not depicted) to facilitate mixing of the feedstock 116 with the heat carrier 111 and to convey the resulting mixture through the reactor first stage 105.

As the feedstock is rapidly heated in the reactor first stage 105, it is at least partially pyrolyzed to form a first product comprising a first condensable pyrolysis vapors 132 and a first solids 146 comprising partially-pyrolyzed feedstock and char.

The reactor second stage 135 is maintained at a temperature in the range from 401° C. to 700° C. and receives the first solids that fall by gravitational force into a bed 146 contained by receptacle 145. The bed 146 that receives the first solids comprises char and partially-pyrolyzed feedstock that is further pyrolyzed in the reactor second stage 135 for an additional residence time in the range from 30 seconds to 120 seconds. Meanwhile, the first condensable pyrolysis vapors 132 rise within the reactor second stage 135. The second reactor stage 135 is maintained at a temperature that facilitates pyrolysis of the partially-pyrolyzed feedstock in the bed 146 to produce a second condensable pyrolysis vapors 148 and a second solids 162 comprising char that leaves the reactor second stage 135 via second solids outlet 165. Optionally, a catalyst 150 may be added to the reactor second stage 135 via one or more inlets 151, 152 to facilitate: a) additional pyrolysis of the partially-pyrolyzed feedstock in the bed 146, b) upgrading of the compounds within the second condensable pyrolysis vapors 148, or c) both of these functions.

Again referring to the embodiment depicted in FIG. 2, the second condensable pyrolysis vapors 148 rise within the reactor second stage 135, and a second sweep gas 153 is added via one or more inlets 154, 155 located proximate the lower end of the reactor second stage 135. The second sweep gas 153 moves through the bed 146 to assist in minimizing the residence time of the second condensable pyrolysis vapors 148 within the first solids 146. In certain embodiments, the second sweep gas 153 comprises a reducing gas that may be methane, an alkene, hydrogen gas or any other gaseous molecule capable of donating electrons to molecules in the pyrolysis vapors. Optionally, the reactor second stage 135 is configured such that the second sweep gas 153 enters and moves upward through the bed 146, thereby assisting the transport of the second condensable vapors 148 upward to combine with the first condensable pyrolysis vapors 132 in or near the disengagement zone 156. The combined condensable pyrolysis vapors (not depicted) are separated from the first and second solids in the disengagement zone 156 located generally above the interface 130, allowing the combined pyrolysis vapors 159 to leave the second reactor stage 135 via an outlet 157 located proximate the top of the second reactor stage 135.

Optionally the second sweep gas is heated to a temperature that assists in controlling the temperature that is maintained in the reactor second stage. In certain embodiments, the second sweep gas is hotter than the temperature of the solids in the bed 146, thereby transferring heat to the solids and facilitating higher temperature pyrolysis.

To reduce particle entrainment leading to heat carrier 111 exiting the pyrolysis reactor second stage 135 via outlet 157, the median heat carrier 111 particle size is greater than about 100 microns, and preferably greater than about 250 microns. For similar reasons, the bulk density of the heat carrier 111 particles is at least 500 kg/m$^3$, and preferably greater than about 1,000 kg/m$^3$.

Further referring to FIG. 2, the bed 146 comprising the first solids, second solids 162 and optionally, one or more catalysts gradually moves downward in the receptacle 145 of the reactor second stage 135 and leaves the reactor second stage 135 via a solids outlet 165. Optionally, an upgrading reactor 160 containing at least one bed of an active upgrading catalyst 161 may be arranged within close proximity of the outlet 157 of the reactor second stage. In certain embodiments, the outlet of the reactor second stage is in direct contact with the upgrading reactor to minimize the residence time between production of the pyrolysis vapors and contacting the upgrading catalyst 161 in the upgrading reactor 160.

In certain embodiments, the upgrading catalyst 161 may, for example, hydrogenate and/or deoxygenate the pyrolysis vapors, or facilitate any other known reaction that assists in converting the pyrolysis vapors to a viable transportation fuel or refinable fuel intermediate. The upgrading reactor 160 may be operated as a fixed bed, fluid bed, or moving bed. Removing solids comprising char via the disengagement zone 156 prior to contacting condensable pyrolysis vapors with at least one upgrading catalyst 161 prevents catalyst fouling/poisoning. The products from the upgrading reactor 160 may be condensed or further upgraded, thereby generating a viable transportation fuel or upgradable fuel intermediate.

Conventional pyrolysis methods and systems have suffered from either 1) char carry over in the pyrolysis vapors, leading to upgrading catalyst deactivation, or 2) use of mechanical separation devices to remove char from pyrolysis vapors, which results in an undesirable delay prior to catalytic upgrading. This delay can allow secondary pyrolysis reactions to occur that produce products comprising 16 or more carbons that are difficult to upgrade into a bio-derived fuel. The present inventive disclosure does not employ a conventional cyclone, thus further reducing vapor residence time by removing additional piping and a reactor vessel, and can be readily tailored to remove smaller particles while still maintaining short residence times. The "disengagement zone" utilized in the present inventive systems and processes is designed to provide a space where the upward local velocity of the gaseous products (including condensable pyrolysis vapors) is sufficient to entrain less than 0.5% (by wt.) of the solids comprising char particles produced by the pyrolysis of the lignocellulosic biomass feedstock. In certain embodiments, the upward local velocity of the gaseous products is sufficient to entrain less than 0.1% (by wt.) of the char produced by the pyrolysis of the biomass feedstock. Achieving this low percentage of char carryover requires designing the height and diameter of the disengagement zone to allow the terminal falling velocity of the char and heat carrier particles to exceed the upward local velocity of the primary gaseous product exiting an outlet located above the disengagement zone. This results in nearly all char particles being retained in the pyrolysis reactor, thereby preventing these particles from contacting (and poisoning) the one or more downstream upgrading catalysts. As used herein, the term "entrain" is defined as the transport of a solid particle by a gas stream out of the reactor. Entrainment of a given solid particle typically occurs when the local velocity of a gas stream exceeds the terminal falling velocity of the particle.

In certain embodiments, a sweep gas is employed that may comprise one or more of many gases that are either inert or reactive. For example, the sweep gas may comprise gases such as nitrogen, helium, argon, hydrogen, methane and mixtures thereof. If the sweep gas comprises a reactive gas, the reactive gas may optionally react with the biomass during pyrolysis, may serve as a reactant when the pyrolysis products are upgraded by contacting the upgrading catalyst(s), or both. The sweep gas may be injected into the system at more than one point, or injected simultaneously at multiple points. One injection point may combine the sweep gas with the feedstock prior to the resulting mixture entering the pyrolysis reactor, while another injection point may inject sweep gas directly into the pyrolysis reactor at a location near the biomass feedstock inlet. A third point may comprise injecting the sweep gas proximate to the first outlet of the pyrolysis reactor. This may be preferable if the sweep gas is to be used as a reactant during upgrading of the condensable pyrolysis vapors.

The volumetric flow rate, or "standard gas hourly space velocity" (SGHSV) of the sweep gas is adjusted to minimize the time between pyrolysis and catalytic upgrading, such that the upgrading catalyst (or optionally, catalysts) contacts primary products of pyrolysis and not secondary pyrolysis products that comprise 16 or more carbons and are more difficult to upgrade to a bio-derived fuel. Volumetric flow rate for a given embodiment depends upon factors including, but not limited to, the volume of the pyrolysis reactor, the temperature and pressure at which the pyrolysis reactor is maintained, the feed rate of the biomass feedstock to the pyrolysis reactor, and the type of feedstock utilized, and a desire to prevent excessive dilution of the condensable pyrolysis vapors. Such methods are conventional and will not be discussed further here.

The pressure maintained within the pyrolysis reactor is generally within a range of about 0 psig to 3000 psig. Preferably, the pyrolysis reactor is maintained at a pressure in the range of 100 psig to 500 psig to increase throughput of biomass feedstock, and in certain embodiments, facilitates downstream catalytic upgrading of the condensable pyrolysis vapors.

One benefit of the current systems and processes is minimizing the residence time of pyrolysis vapors after their formation in the pyrolysis reactor, while maximizing the conversion of lignocellulosic biomass. Minimizing the residence time of condensable pyrolysis vapors is important for maximizing the percentage of these vapors that are successfully upgraded to a bio-derived fuel. Conditions of temperature and pressure, as well as reactor dimensions are chosen to assure a residence time of the condensable pyrolysis vapors in the pyrolysis reactor that is less than 5 seconds, less than 3 seconds, less than 1 second, less than 0.3 second or even less than 0.1 second.

Minimizing residence time of the condensable pyrolysis vapors in the pyrolysis reactor may prevent the formation of secondary pyrolysis products comprising 16 or more carbon atoms. These larger oxygenated species are likely to form coke, which is extremely detrimental to the process by fouling process equipment and heat carrier. Additionally, diversion of the condensable pyrolysis vapors into secondary pyrolysis reactions decreases the conversion efficiency of the feedstock into smaller species that are more easily upgraded into a bio-derived fuel.

The physical distance between the pyrolysis reactor and the at least one upgrading catalyst contained within one or more downstream upgrading reactors may vary, but is preferably minimized, taking into consideration the space velocity of the condensable pyrolysis vapors (optionally in a mixture with a sweep gas) out of the pyrolysis reactor. Minimizing this distance assists in decreasing the time between production of the primary gaseous product and subsequent contacting with one or more upgrading catalyst(s). Through optimizing the variables of distance and space velocity, the current invention assures that the upgrading catalyst sees primary products from pyrolysis and not secondary products created by reactions occurring after pyrolysis. Generally, the distance between the pyrolyzer and the upgrading catalyst(s) is less than 4 ft. More preferably, this distance is less than 1 ft., and most preferably, less than 6 inches.

Optionally, the disengagement zone between the pyrolyzer and the upgrading catalyst may include additional features to limit reactivity of the primary gaseous product prior to contact with the upgrading catalyst(s). These may include (but are not limited to) temperature control, introduction of a gas or fluid to quench the primary gaseous product (as mentioned previously), flow control through judicious choices in geometry (preferably, a geometry minimizing bends and small orifices to decrease the potential for vapor condensation, the presence of a pre-catalyst (such as zeolite monolith, or any of the above-mentioned upgrading catalysts) at the interface between reactors.

Examples of some upgrading catalysts include, but are not limited to zeolites, metal modified zeolites, and other modified zeolites. Other catalysts may include forms of alumina, silica-alumina, and silica, unmodified or modified with various metals, not limited but including, Nickel, Cobalt, Molybdenum, Tungsten, Cerium, Praseodymium, Iron, Platinum, Palladium, Ruthenium and Copper or mixtures thereof. Still other catalysts may include unsupported metals, supported or unsupported metal oxides or metal phosphides, and mixtures thereof. Catalyst types include deoxygenation catalysts, hydrogenation catalysts, hydrotreating catalysts, hydrocracking catalysts, water-gas-shift catalysts and condensation catalysts. Catalysts may be sulfided or un-sulfided. In certain embodiments, each catalyst bed may comprise mixtures of one or more catalysts of the types described above. Optionally, multiple catalyst beds may be placed within a single reactor, or multiple catalyst beds may be placed in different reactors to facilitate different reaction conditions. When multiple reactors are utilized, they may be arranged to either in parallel or series.

If multiple upgrading reactors are utilized, different conditions may be maintained in each reactor in order to facilitate a given catalytic reaction. To facilitate flow of the vapors through multiple reactors, a pressure differential may be maintained wherein the pressure in each successive reactor progressively decreases. The temperature maintained within each upgrading reactor is generally in the range from 72° F. to 1500° F. Preferably, the temperature is in the range from 100° F. to 1000° F., although if multiple upgrading reactors are used, each may be maintained at a different temperature within this range. Certain upgrading reactions are advantageously conducted at a pressure that is greater than atmospheric pressure. The pressure that is maintained in the one or more reactors may range from 0-3000 psig, although a preferred pressure range is zero to 1000 psig. In certain embodiments, the pressure may range from 10 to 800 psig, from 20 to 650 psig, from 100 to 500 psig. An exemplary pressure might be 400 psig.

The flow of gas and vapors within each upgrading reactor is preferably upward, although downward or lateral gas flow may also be utilized. Upon exiting the final upgrading reactor, upgraded product is directed to a condensation system that functions to reduce the temperature of upgraded product to a temperature that is at or below the dew point for at least one component. Typically, the conditions utilized do not result in the condensation of methane, but preferably will condense C4+ hydrocarbons from the upgraded product. Hydrogen may be separated from the uncondensed product by a variety of conventional methods and recycled as the sweep gas. In certain embodiments, the recycled hydrogen may be added directly into, or just upstream from, an upgrading reactor to facilitate one or more upgrading reactions. Alternatively, the entirety, or some fraction, of the bulk non-condensable gas is used for the same purpose. In another embodiment, the entirety, or some fraction, of the bulk of the non-condensable gas is sent to a combustor or hydrogen generation unit (e.g., a reformer) to generate either heat or hydrogen, respectively. The resulting heat or hydrogen may then be partially or entirely recycled back to the process.

DEFINITIONS

As used herein, the term "standard gas hourly space velocity" or "SGHSV" refers to the gas hourly space velocity of a gas stream measured at standard conditions.

In closing, it should be noted that the discussion of any reference is not an admission that it is prior art to the present disclosure, in particular, any reference that may have a publication date after the priority date of this application. At the same time, each and every claim below is hereby incorporated into this detailed description or specification as an additional embodiment of the present invention.

We claim:
1. A process for pyrolyzing lignocellulosic biomass in a two-stage pyrolysis reactor, comprising the steps of:
   a) pyrolyzing a lignocellulosic feedstock in a reactor first stage that is maintained at a temperature from 315° C. to 400° C., wherein the reactor first stage comprises at least one auger that conveys the lignocellulosic biomass feedstock through the reactor first stage from a first end portion toward a second end portion, for a lignocellulosic feedstock residence time ranging from 5 to 20 seconds, thereby producing a first product comprising a first condensable pyrolysis vapors and a first solids comprising partially-pyrolyzed feedstock and char;
   b) passing the first product out of the reactor first stage via an interface located near the second end portion of the reactor first stage and directly into a reactor second stage that is maintained at a temperature in the range from 401° C. to 700° C.;
   c) pyrolyzing the partially-pyrolyzed feedstock in the reactor second stage for a second feedstock residence time in the range from 30 seconds to 120 seconds to form a second condensable pyrolysis vapors that mixes with the first condensable pyrolysis vapors, and to form a second solids comprising char that mixes with the first solids to form combined solids;
   d) separating the first and second condensable pyrolysis vapors from the combined solids in a space located within the top of the reactor second stage, wherein the first condensable pyrolysis vapors are removed from the pyrolysis reactor within five seconds after being produced by the pyrolyzing of step a), and the second condensable pyrolysis vapors are removed from the pyrolysis reactor within five seconds after being produced by the pyrolyzing of step c).

2. The process of claim 1, wherein the terminal falling velocity of particles in the combined solids becomes greater than the upward local velocity of the first and second condensable pyrolysis vapors in the space at the top of the reactor second stage, thereby causing at least 99.5 wt. % of the combined solids to be retained in the reactor second stage.

3. The process of claim 1, wherein the second pyrolysis reactor comprises a bed containing at least one catalyst that facilitates pyrolysis of the un-pyrolyzed biomass, facilitates upgrading of the second condensable pyrolysis vapors to a transportation fuel or fuel intermediate, or combinations thereof.

4. The process of claim 2, wherein the at least one catalyst is added to the bed either continuously or intermittently via at least one catalyst inlet.

5. The process of claim 1, wherein the first condensable pyrolysis vapors is derived predominantly from the pyrolysis of one or more of hemicellulose and cellulose, and the second condensable pyrolysis vapors is derived predominantly from the pyrolysis of lignin.

6. The process of claim 1, further comprising contacting the combined first and second condensable pyrolysis vapors with at least one upgrading catalyst downstream from the reactor second stage to produce a biofuel, or an intermediate thereof.

7. The process of claim 1, wherein the reactor first stage is maintained at a temperature in the range from 325° C. to 400° C.

8. The process of claim 1, wherein the reactor second stage is maintained at a temperature in the range from 450° C. to 700° C.

9. The process of claim 1, wherein the reactor second stage is maintained at a temperature in the range from 500° C. to 700° C.

10. The process of claim 1, wherein the reactor second stage is maintained temperature that is at least 50° C. higher than the reactor first stage.

11. The process of claim 1, wherein the reactor second stage is maintained temperature that is at least 100° C. higher than the reactor first stage.

12. The process of claim 1, wherein the first condensable pyrolysis vapors are removed from the pyrolysis reactor within 3 sec after being produced by the pyrolyzing of step a), and the second condensable pyrolysis vapors are removed from the pyrolysis reactor within 3 sec after being produced by the pyrolyzing of step c).

13. The process of claim 1, wherein the first condensable pyrolysis vapors are removed from the pyrolysis reactor within 1 sec after being produced by the pyrolyzing of step a), and the second condensable pyrolysis vapors are removed from the pyrolysis reactor within 1 sec after being produced by the pyrolyzing of step c).

14. The process of claim 1, wherein more than one reactor first stage directly interfaces with the reactor second stage, each reactor first stage passing the first product directly into the reactor second stage.

\* \* \* \* \*